United States Patent
Liu et al.

(10) Patent No.: US 8,570,483 B2
(45) Date of Patent: Oct. 29, 2013

(54) LIQUID CRYSTAL LENS

(75) Inventors: Sheng-Chi Liu, Taipei County (TW); Cheng-Chung Hu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 465 days.

(21) Appl. No.: 12/789,447

(22) Filed: May 27, 2010

(65) Prior Publication Data

US 2011/0249206 A1 Oct. 13, 2011

(30) Foreign Application Priority Data

Apr. 12, 2010 (TW) .............................. 99206428 U (51) Int. Cl.
*G02F 1/13* (2006.01)
*G02F 1/1335* (2006.01)
*G02F 1/1343* (2006.01)

(52) U.S. Cl.
USPC ............... 349/200; 349/13; 349/57; 349/139

(58) Field of Classification Search
USPC .................. 349/13–15, 57, 141–142, 200
See application file for complete search history.

(56) References Cited

U.S. PATENT DOCUMENTS

| 7,511,774 B2* | 3/2009 | Lee et al. ................... 349/15 |
| 7,880,858 B2* | 2/2011 | Chen .......................... 349/200 |
| 2009/0122210 A1* | 5/2009 | Im ............................... 349/15 |
| 2009/0153653 A1* | 6/2009 | Lee et al. ................... 348/59 |

\* cited by examiner

*Primary Examiner* — Bumsuk Won
*Assistant Examiner* — Charles Chang
(74) *Attorney, Agent, or Firm* — Jianq Chyun IP Office (57) ABSTRACT

A liquid crystal lens including a first substrate, a first electrode layer, a liquid crystal layer and a second electrode layer is provided. The second electrode layer includes a plurality of first electrode patterns and a plurality of second electrode patterns. The second electrode patterns are opposite to the first electrode patterns, respectively, and the second electrode patterns and the first electrode patterns are alternately arranged. A square measure of first or second electrode patterns decreases from an edge of the liquid crystal lens to a center of the liquid crystal lens, so that a resistance of the first or second electrode patterns increases from the edge to the center of the liquid crystal lens.

13 Claims, 9 Drawing Sheets

LIQUID CRYSTAL LENS

CROSS-REFERENCE TO RELATED APPLICATION

This application claims the priority benefit of Taiwan application Ser. No. 99206428, filed on Apr. 12, 2010. The entirety of the above-mentioned patent application is hereby incorporated by reference herein and made a part of specification.

BACKGROUND OF THE INVENTION

1. Field of Invention

The invention generally relates to a liquid crystal lens, and more particularly to a liquid crystal lens with a preferable optical imaging characteristic.

2. Description of Related Art

Figure 1:
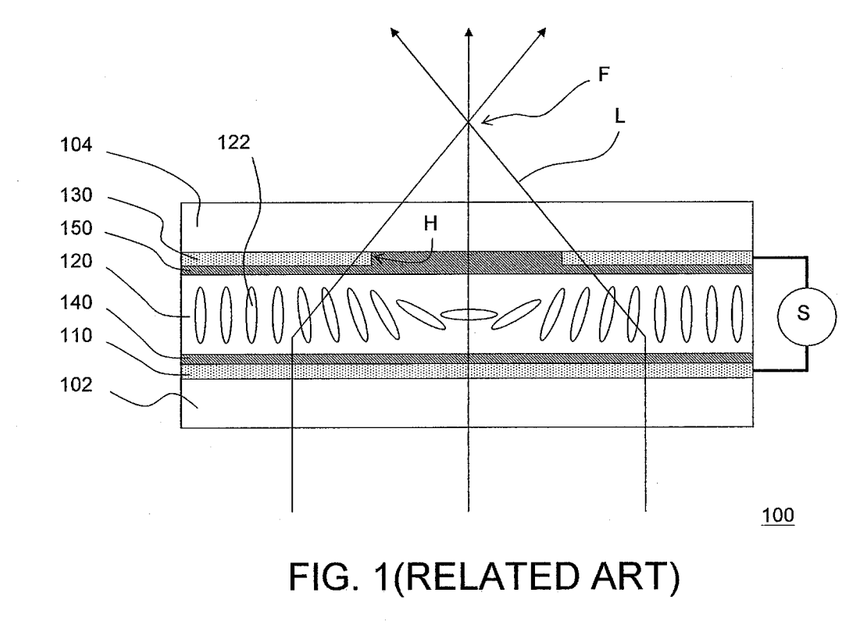
FIG. 1 is a schematic view of a conventional liquid crystal lens.

FIG. 1 is a schematic view of a conventional liquid crystal lens. Referring to FIG. 1, a liquid crystal lens 100 includes a first substrate 102, a first electrode layer 110, a liquid crystal layer 120, a second electrode layer 130, and a second substrate 104 stacked in sequence. An alignment layer 140 and an alignment layer 150 are disposed between the liquid crystal layer 120 and the first and second substrates 102 and 104, respectively, so that a liquid crystal molecule 122 in the liquid crystal layer 120 has a predetermined alignment direction. Typically speaking, the second electrode layer 130 has an opening H located at a center of the liquid crystal lens 100.

When using the liquid crystal lens 100, the liquid crystal molecule 122 in the liquid crystal layer 120 tilts according to an electric field direction, for example through a signal source S applying a voltage signal to the first and second electrode layers 110 and 130. Since the opening H is located at the center of the liquid crystal lens 100, a center region of the liquid crystal lens 100 has a weaker electric field intensity, and an edge region of the liquid crystal lens 100 has a stronger electric field intensity. Accordingly, a non-uniform electric field variation is formed between the first and second electrode layers 110 and 130. Moreover, the liquid crystal molecule 122 in the liquid crystal layer 120 produces a different degree of tilt according to the electric field variation, so that the liquid crystal layer 120 produces a step-wise variation of a refractive index. For example, when a light beam L passes through the liquid crystal lens 100, the light beam L generates a light condensing effect due to the refractive index variation of the liquid crystal layer 120, and the light beam L is concentrated on a focus F depicted in FIG. 1.

However, the step-wise variation of the refractive index in the liquid crystal lens 100 still significantly differs from a typical optical lens. In other words, the conventional liquid crystal lens 100 cannot achieve an optical imaging characteristic of a typical lens.

SUMMARY OF THE INVENTION

An aspect of the invention provides a liquid crystal lens having a preferable optical imaging characteristic.

An aspect of the invention provides a liquid crystal lens including a first substrate, a first electrode layer, a liquid crystal layer, and a second electrode layer. The first electrode layer is disposed on the first substrate, and the liquid crystal layer is disposed on the first electrode layer. The second electrode layer is disposed on the liquid crystal layer, and the second electrode layer includes a plurality of first electrode patterns and a plurality of second electrode patterns. The second electrode patterns are respectively opposite to the first electrode patterns, and the second electrode patterns and the first electrode patterns are alternately arranged. Moreover, a square measure of the first or second electrode patterns decreases from an edge of the liquid crystal lens to a center of the liquid crystal lens, so that a resistance of the first or second electrode patterns increases from the edge of the liquid crystal lens to the center of the liquid crystal lens.

According to an embodiment of the invention, the second electrode layer further includes a first main segment and a second main segment. Moreover, the first main segment is parallel to the second main segment, the first main segment is coupled to the first electrode patterns, and the second main segment is coupled to the second electrode patterns. The first and second electrode patterns are respectively perpendicular to the first and second main segments.

According to an embodiment of the invention, the first main segment is electrically connected to a first signal source, and the second main segment is electrically connected to a second signal source. The first and second signal sources respectively provide an alternating current signal to the first and second electrode patterns, such that the first electrode patterns and the second electrode patterns respectively has an amplitude difference and a phase difference. Moreover, a voltage range of the alternating current signal is less than 50 volts.

According to an embodiment of the invention, the first and second electrode patterns are disposed on two sides of the liquid crystal lens. The first electrode patterns disposed on one of the sides of the liquid crystal lens are symmetrical with respect to the first electrode patterns disposed on the other side of the liquid crystal lens. The second electrode patterns disposed on one of the sides of the liquid crystal lens are symmetrical with respect to the second electrode patterns disposed on the other side of the liquid crystal lens. On one of the sides of the liquid crystal lens, a distance between each of the first electrode patterns and an adjacent one of the second electrode patterns is the same or different.

According to an embodiment of the invention, the liquid crystal lens further includes a first alignment layer and a second alignment layer. The first alignment layer is disposed between the first electrode layer and the liquid crystal layer, and the second alignment layer is disposed between the liquid crystal layer and the second electrode layer.

According to an embodiment of the invention, the liquid crystal lens further includes a second substrate disposed on the second electrode layer.

According to an embodiment of the invention, the liquid crystal lens further includes a second substrate disposed between the second electrode layer and the liquid crystal layer.

According to an embodiment of the invention, a portion of each of the first and second electrode patterns has a same width, and a width of other portions of each of the first and second protrusions decreases from the edge to the center of the liquid crystal lens.

According to an embodiment of the invention, a width of each of the first and second electrode patterns decreases from the edge to the center of the liquid crystal lens.

According to an embodiment of the invention, the width of each of the first and second protrusions is between 2 micrometers to 500 micrometers, inclusive.

According to an embodiment of the invention, a material of the first and second electrode layers comprises indium tin oxide (ITO) or indium zinc oxide (IZO).

According to an embodiment of the invention, the first and second electrode patterns are respectively coupled to a plurality of signal sources. Moreover, the signal sources respectively provide an alternating current signal to the first and second electrode patterns, such that the first electrode patterns and the second electrode patterns respectively has an amplitude difference and a phase difference.

The liquid crystal lens according to embodiments of the invention has dual electrode patterns with complementing finger shapes. The square measure of the electrode patterns decreases from the edge to the center of the liquid crystal lens. When the alternating current signal is applied to the dual electrode patterns, the plurality of electrode patterns produces a voltage division effect, so that a refractive index variation of the liquid crystal lens approaches the refractive index variation of an ideal lens. Therefore, the liquid crystal lens according to embodiments of the invention has a preferable optical imaging characteristic.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
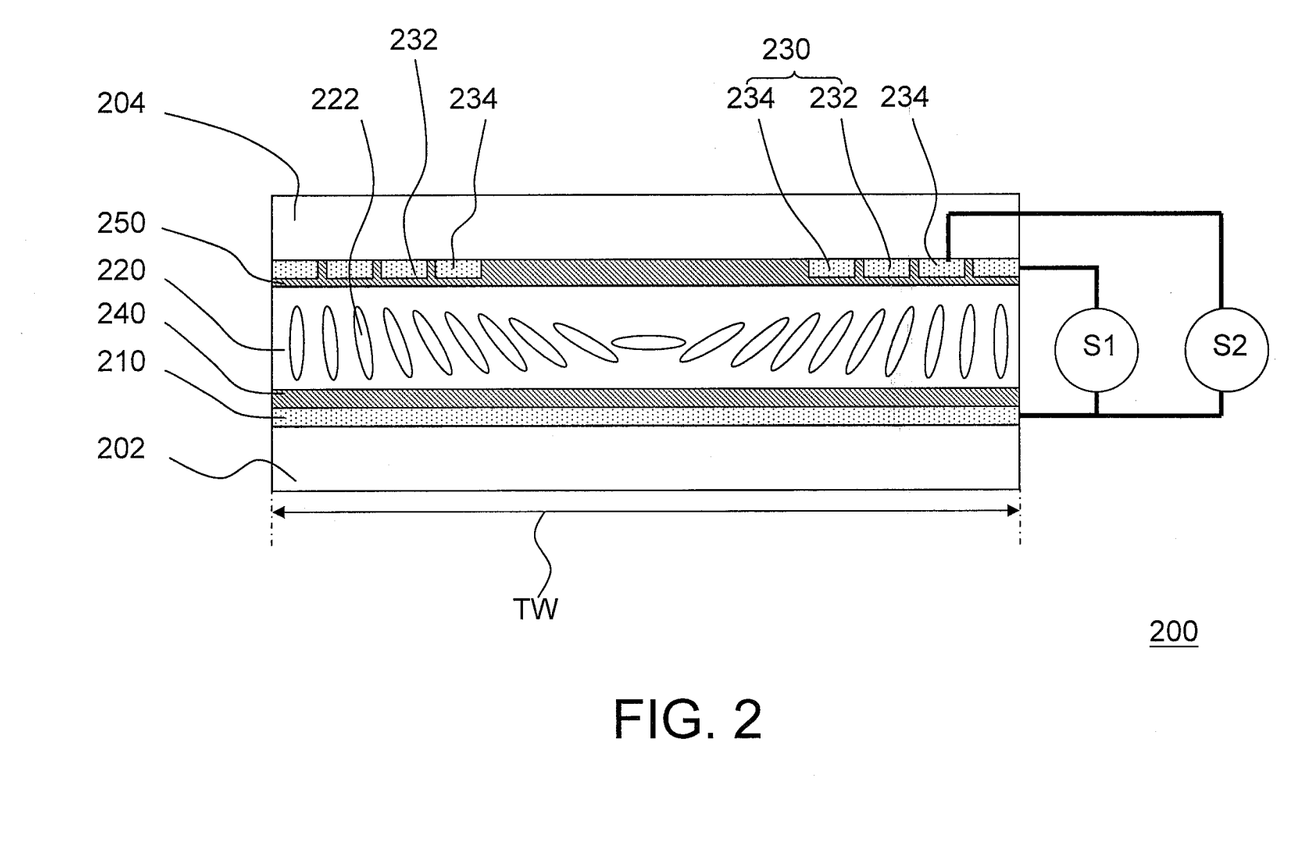
FIG. 2 is a schematic cross-sectional view of a liquid crystal lens in accordance with an embodiment of the invention.
Figure 3:
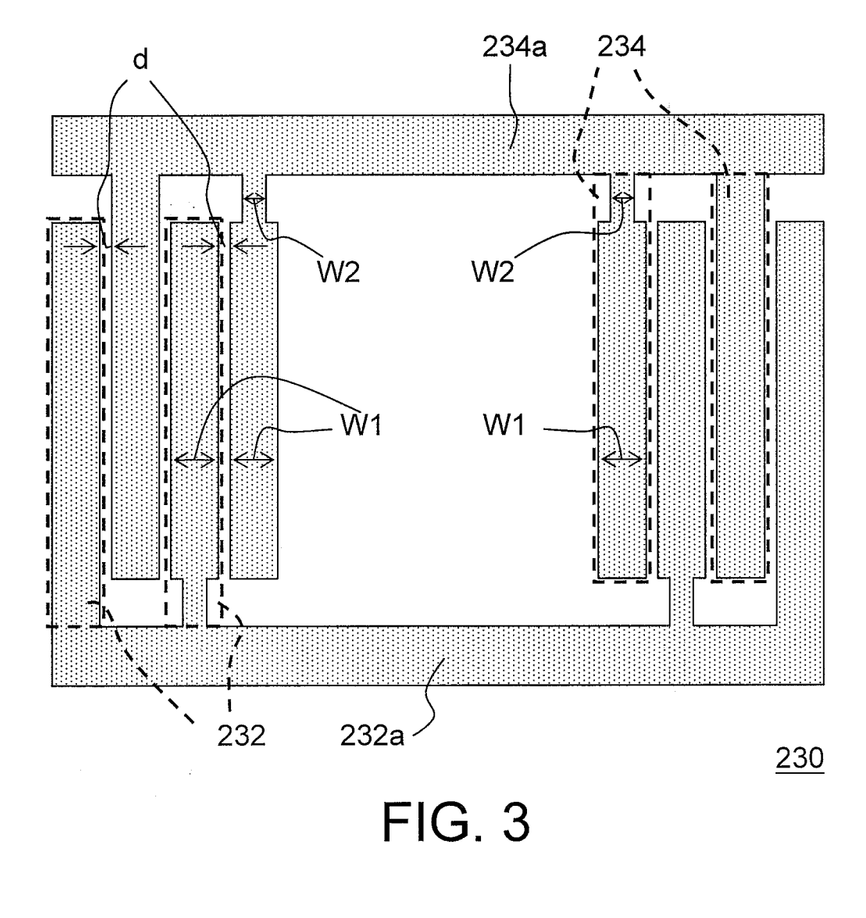
FIG. 3 is a schematic top view of a second electrode layer depicted in FIG. 2.

FIG. 2 is a schematic cross-sectional view of a liquid crystal lens in accordance with an embodiment of the invention. FIG. 3 is a schematic top view of a second electrode layer depicted in FIG. 2. Referring to FIG. 2, a liquid crystal lens 200 includes a first substrate 202, a first electrode layer 210, a liquid crystal layer 220, a second electrode layer 230, and a second substrate 204. A width TW of the liquid crystal lens 200 according to the present embodiment is, for example, 200 micrometers. To facilitate description, in the embodiments of the invention broadly described herein, the widths TW of the liquid crystal lenses are all exemplarily 200 micrometers.

The first electrode layer 210 is disposed on the first substrate 202, and the liquid crystal layer 220 is disposed on the first electrode layer 210. The second electrode layer 230 is disposed on the liquid crystal layer 220, and the second substrate 204 is disposed on the second electrode layer 230. In the present embodiment, the liquid crystal lens 200 further includes a first alignment layer 240 and a second alignment layer 250. The first alignment layer 240 is disposed between the first electrode layer 210 and the liquid crystal layer 220, and the second alignment layer 250 is disposed between the liquid crystal layer 220 and the second electrode layer 230. Moreover, the liquid crystal lens 200 in the present embodiment includes the second substrate 204 disposed on the second electrode 230, although the invention is not limited thereto. In other embodiments of the invention, the second substrate 204 may also be disposed between the second electrode layer 230 and the liquid crystal layer 220.

In the present embodiment, the first and second substrates 202 and 204 are glass substrates, for example. In other embodiments of the invention, the first and second substrates 202 and 204 may be transparent substrates comprised of other materials. A material of the first and second electrode layers 210 and 230 may comprise of indium tin oxide (ITO), indium zinc oxide (IZO), or any other suitable transparent conductive materials.

Referring to FIG. 3, the second electrode layer 230 includes a first main segment 232a, a plurality of first electrode patterns 232, a second main segment 234a, and a plurality of second electrode patterns 234. In the present embodiment of the invention, the first electrode patterns 232 are perpendicular to the first main segment 232a, and the first main segment 232a is coupled to the first electrode patterns 232. The first electrode patterns 232 are disposed on two sides of the liquid crystal lens 200. The first electrode patterns 232 disposed on one of the sides of the liquid crystal lens 200 are symmetrical with respect to the first electrode patterns 232 disposed on the other side of the liquid crystal lens 200. In other words, the first electrode patterns 232 are exemplarily comb shaped or finger shaped electrode patterns.

The second electrode patterns 234 are opposite to the first electrode patterns 232, and the second electrode patterns 234 and the first electrode patterns 232 are alternately arranged. The second electrode patterns 234 are disposed, for example, on two sides of the liquid crystal lens 200. The second electrode patterns 234 disposed on one of the sides of the liquid crystal lens 200 are symmetrical with respect to the second electrode patterns 234 disposed on the other side of the liquid crystal lens 200. Similarly, the second electrode patterns 234 are exemplarily comb shaped or finger shaped electrode patterns.

In the present embodiment, the second main segment 234a is parallel to the first main segment 232a. Moreover, the second electrode patterns are perpendicular to the second main segment 234a, and the second main segment 234a is coupled to the second electrode patterns 234. The second electrode patterns 234 protrude from the second main segment 234a and are extended between the first electrode patterns 232. Specifically, the first electrode patterns 232 and the second electrode patterns 234 form, for example, a pattern of mutually complementing finger or comb shapes.

A square measure of each of the first and second electrode patterns 232 and 234 decreases from an edge of the liquid crystal lens 200 to a center of the liquid crystal lens 200. In the present embodiment of the invention, a portion of each of the first and second electrode patterns 232 and 234 has a same width W1. Moreover, adjacent first and second electrode patterns 232 and 234 are a same distance d apart. In addition, a width W2 of other portions of the first and second electrode patterns 232 and 234 decreases from the edge to the center of the liquid crystal lens 200. More specifically, besides the outermost first and second electrode patterns 232 and 234, the rest of the first and second electrode patterns 232 and 234 (e.g., near the center of the liquid crystal lens 200) respectively includes two rectangular shapes connected to each other and having different widths.

Since a resistance and a cross-sectional square measure of a conductive line are inversely proportional, a conductive line with a smaller width has a higher resistance. Therefore, in a design of the electrode pattern in accordance with the present embodiment, a resistance of each of the first and second electrode patterns 232 and 234 increases from the edge to the center of the liquid crystal lens 200.

Figure 4A:
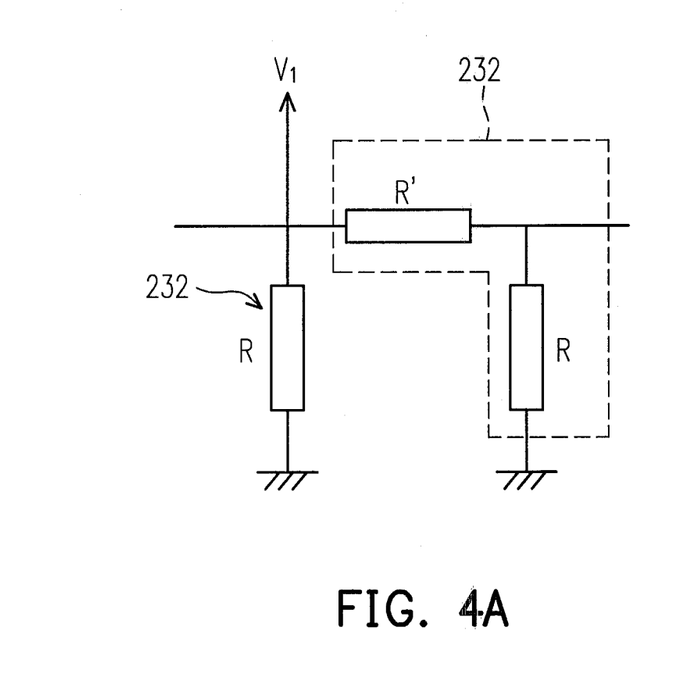
FIG. 4A is an equivalent circuit diagram of one of the sides of a first electrode pattern depicted in FIG. 3.
Figure 4B:
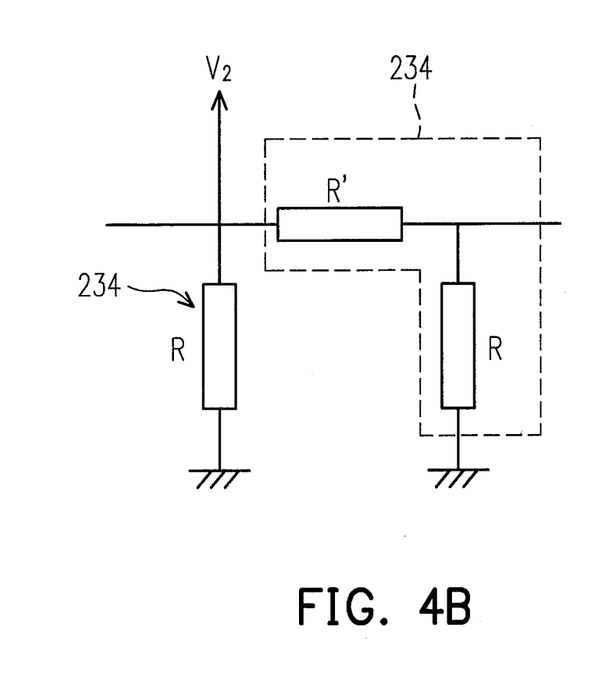
FIG. 4B is an equivalent circuit diagram of one of the sides of a second electrode pattern depicted in FIG. 3.

FIG. 4A is an equivalent circuit diagram of one of the sides of a first electrode pattern depicted in FIG. 3. FIG. 4B is an equivalent circuit diagram of one of the sides of a second electrode pattern depicted in FIG. 3. Referring to FIGS. 4A and 4B, a resistance of an outermost first electrode pattern 232 of the first electrode patterns 232 (e.g., a rectangular region of width W1) is R, for example. Moreover, a resistance of another one of the first electrode patterns 232 (e.g., two rectangular regions of widths W1 and W2) is R+R', for example. Therefore, when a voltage V1 passes through the first electrode patterns 232, because each of the first electrode patterns 232 has a different resistance, the first electrode patterns 232 disposed at different locations have different voltages. In other words, the first electrode patterns 232 according to the present embodiment may produce a voltage division effect.

From another perspective, a resistance of an outermost second electrode pattern 234 of the second electrode patterns 234 (e.g., a rectangular region of width W1) is R, for example. Moreover, a resistance of another one of the second electrode patterns 234 (e.g., two rectangular regions of widths W1 and W2) is R+R', for example. Similarly, when a voltage V2 passes through the second electrode patterns 234, because each of the second electrode patterns 234 has a different resistance, the second electrode patterns 234 disposed at different locations have different voltages. Hence, the second electrode patterns 234 according to the present embodiment may produce the voltage division effect.

Referring to FIG. 2, in the present embodiment, the first main segment 232a is electrically connected to a first signal source S1, whereas the second main segment 234a is electrically connected to a second signal source S2, for example. The first and second signal sources S1 and S2 respectively provides an alternating current signal to the first and second electrode patterns 232 and 234, so that the first electrode patterns 232 and the second electrode patterns 234 have an amplitude difference and a phase difference. The amplitude difference of the first electrode patterns 232 and the second electrode patterns 234 may be adjusted, for example, according to a practical need. A voltage range of the alternating current signal employed in the present embodiment is, for example, less than 50 volts, and more preferably less than 10 volts.

It should be noted that, alternatively in other embodiments of the invention not illustrated herein, the first electrode patterns and the second electrode patterns may be respectively connected to a plurality of signal sources. Moreover, these signal sources respectively provide an alternating current signal to the first and second electrode patterns, so that the first electrode patterns and the second electrode patterns 234 have an amplitude difference and a phase difference. In other words, embodiments of the invention do not restrict how the signal sources and the second electrode layer 230 are electrically connected.

Figure 5A:
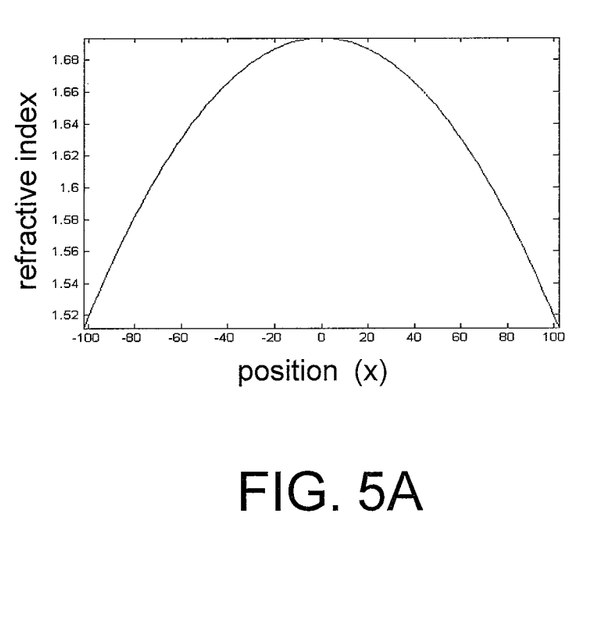
FIG. 5A is schematic view illustrating a refractive index variation of an ideal lens.
Figure 5B:
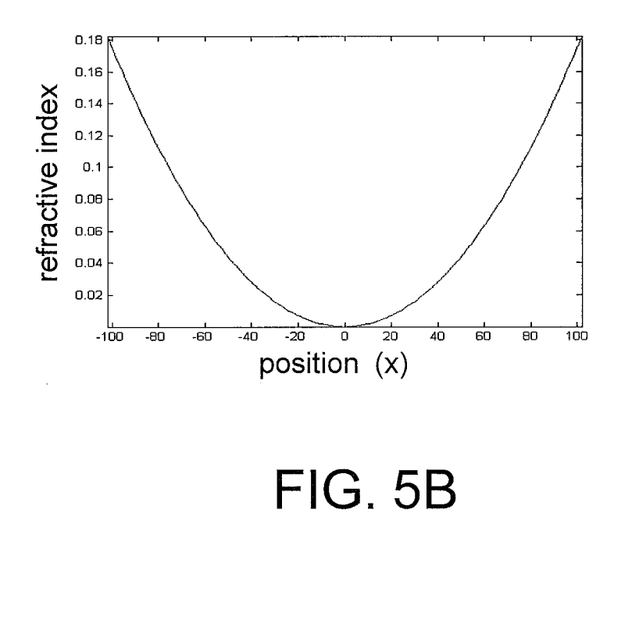
FIG. 5B is schematic view illustrating an ideal refractive index variation of a liquid crystal lens after being voltage driven.

FIG. 5A is a schematic view illustrating a refractive index variation of an ideal lens. FIG. 5B is schematic view illustrating an ideal refractive index variation of a liquid crystal lens after being voltage driven. Referring to FIGS. 5A and 5B, it should be understood that, in accordance with the formulas listed below, a position of each electrode (e.g., the first and second electrode patterns 232 and 234), an electrode field generated by each electrode, and a refractive index produced on the liquid crystal lens by each electrode are derived, so as to achieve the refractive index variation as depicted in FIG. 5B in the liquid crystal lens 200 of the present embodiment. The center of the liquid crystal lens 200 is set as an origin (i.e., x=0).

For example, assuming the refractive index produced on the liquid crystal lens 200 by each electrode is directly proportional to the electric field generated by each electrode, accordingly a Formula (1) is obtained, $$|\vec{E}| \propto n(x) \qquad \text{Formula (1),}$$

in which $|\vec{E}|$ represents electric field and $n(x)$ represents the liquid crystal refractive index at a location $x$, and from Formula (1) the following formulas may be derived, $$n_1 = x_1 E_1(1) + x_1 E_2(1) + x_1 E_3(1) + \ldots + x_1 E_m(1)$$
$$n_2 = x_2 E_1(2) + x_2 E_2(2) + x_2 E_3(2) + \ldots + x_2 E_m(2)$$
$$n_2 = x_3 E_1(3) + x_3 E_2(3) + x_3 E_3(3) + \ldots + x_3 E_m(3)$$
$$\vdots$$
$$n_m = x_m E_1(m) + x_m E_2(m) + x_m E_3(m) + \ldots + x_m E_m(m)$$

in which $x_1$-$x_m$ respectively represents m different locations on the liquid crystal lens 200, $E_1(1)$-$E_m(1)$ represents electric fields generated by electrodes of different locations at a location $x_1$, $E_1(2)$-$E_m(2)$ represents electric fields generated by electrodes of different locations at a location $x_2$, $E_1(3)$-$E_m(3)$ represents electric fields generated by electrodes of different locations at a location $x_3$, and similarly, $E_1(m)$-$E_m(m)$ represents electric fields generated by electrodes of different locations at a location $X_m$.

Moreover, Formula (2) may be derived from the aforementioned formulas, $$\begin{bmatrix} n_1 \\ n_2 \\ n_3 \\ \vdots \\ n_m \end{bmatrix} = \begin{bmatrix} E_1(1) & E_2(1) & E_3(1) & \cdots & E_m(1) \\ E_1(2) & E_2(2) & E_3(2) & \cdots & E_m(2) \\ E_1(3) & E_2(3) & E_3(3) & \cdots & E_m(3) \\ \vdots & \vdots & \vdots & & \vdots \\ E_1(m) & E_2(m) & E_3(m) & \cdots & E_m(m) \end{bmatrix} \cdot \begin{bmatrix} x_1 \\ x_2 \\ x_3 \\ \vdots \\ x_m \end{bmatrix}, \qquad \text{Formula (2)}$$

and Formula (3) may be derived from Formula (2), $$\begin{bmatrix} x_1 \\ x_2 \\ x_3 \\ \vdots \\ x_m \end{bmatrix} = \begin{bmatrix} E_1(1) & E_2(1) & E_3(1) & \cdots & E_m(1) \\ E_1(2) & E_2(2) & E_3(2) & \cdots & E_m(2) \\ E_1(3) & E_2(3) & E_3(3) & \cdots & E_m(3) \\ \vdots & \vdots & \vdots & & \vdots \\ E_1(m) & E_2(m) & E_3(m) & \cdots & E_m(m) \end{bmatrix}^{-1} \cdot \begin{bmatrix} n_1 \\ n_2 \\ n_3 \\ \vdots \\ n_m \end{bmatrix}, \qquad \text{Formula (3)}$$

Figure 6:
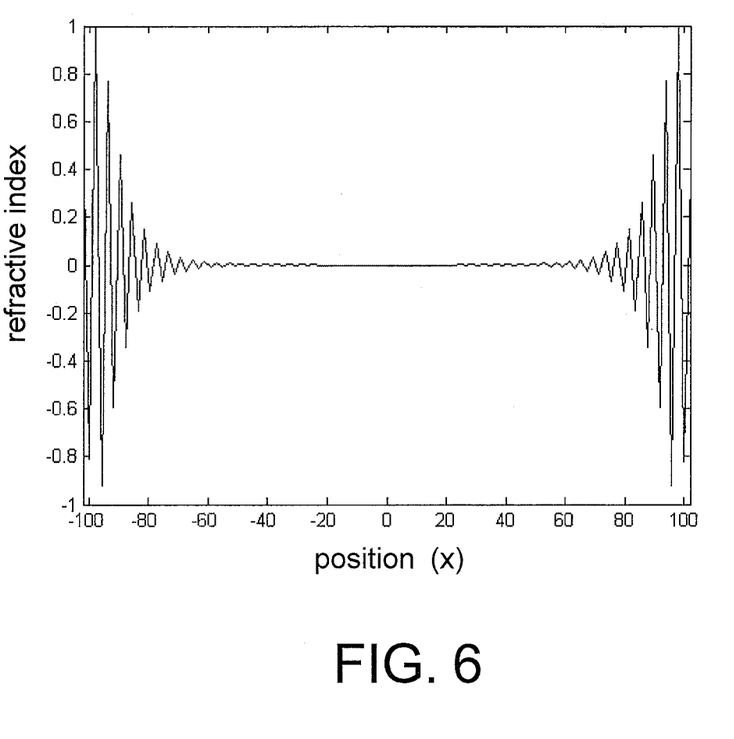
FIG. 6 is a schematic view illustrating an electrode distribution in accordance with an embodiment of the invention.

By referring to the ideal liquid crystal refractive index depicted in FIG. 5B, and by calculation of the above-described Formula (1)-Formula (3), the positions of a plurality of electrodes may be derived (e.g., the first and second electrode patterns 232 and 234). Furthermore, the width W and the quantity of the electrodes may be obtained, as well as the distance d, and thereby an electrode distribution depicted in FIG. 6 is achieved.

In the present embodiment of the invention, the width W1 of the first and second electrode patterns 232 and 234 may be, for example, between 2-500 micrometers, inclusive. In other embodiments of the invention, for a liquid crystal lens having a total width TW between 100-300 micrometers, the width W1 of the first and second electrode patterns 232 and 234 is more preferably 5 micrometers.

The liquid crystal lens 200 according to the present embodiment may achieve the voltage division effect by the electrode pattern design of the second electrode layer 230, therefore each individual electrode does not require a complex voltage control process. With regards to the first electrode patterns 232 or the second electrode patterns 234, by merely providing a single alternating current signal, the electrode patterns of the electrodes may have different voltage values, and thereby produce the required step-wise electric field variation. Accordingly, a liquid crystal molecule 222 in the liquid crystal layer 220 tilts in accordance with the step-wise electric field variation, so that the refractive index variation of the liquid crystal lens 200 approaches the refractive index variation of an ideal lens. Therefore, the liquid crystal lens 200 of the present embodiment may have a preferable optical imaging characteristic.

The second electrode layer 230 adopted by the aforementioned embodiment is merely used for illustration. Below, several other electrode pattern designs are described, in which like components are designated with the same labels and not repeatedly mentioned.

Figure 7:
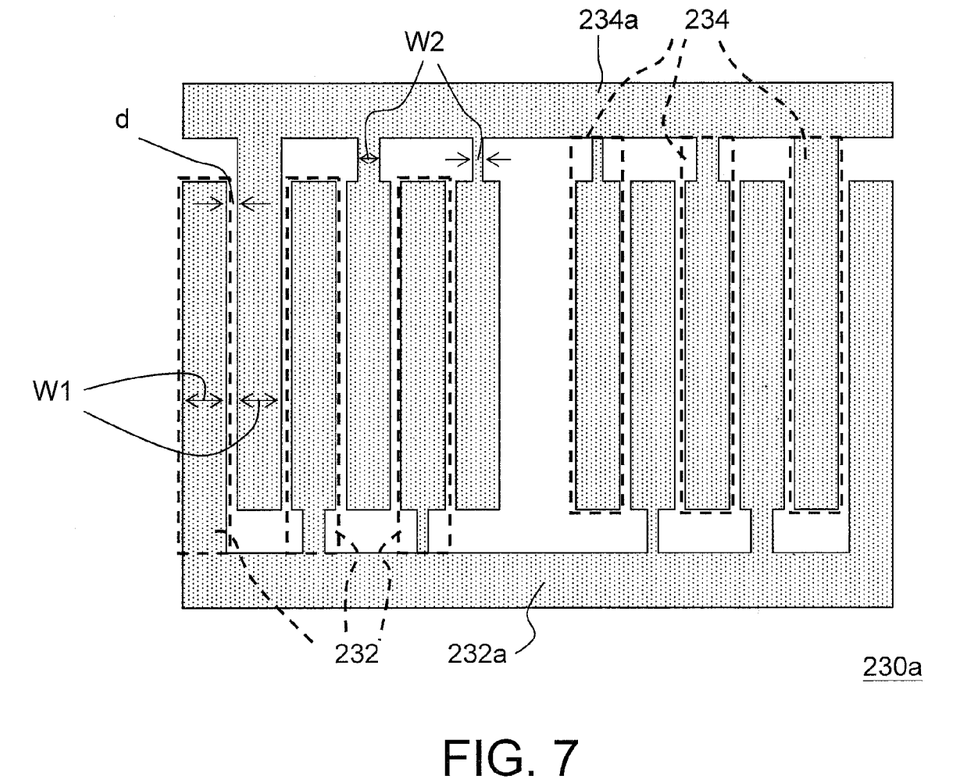
FIGS. 7-9 are respective schematic views of a second electrode layer of a liquid crystal lens in accordance with an embodiment of the invention.
Figure 8:
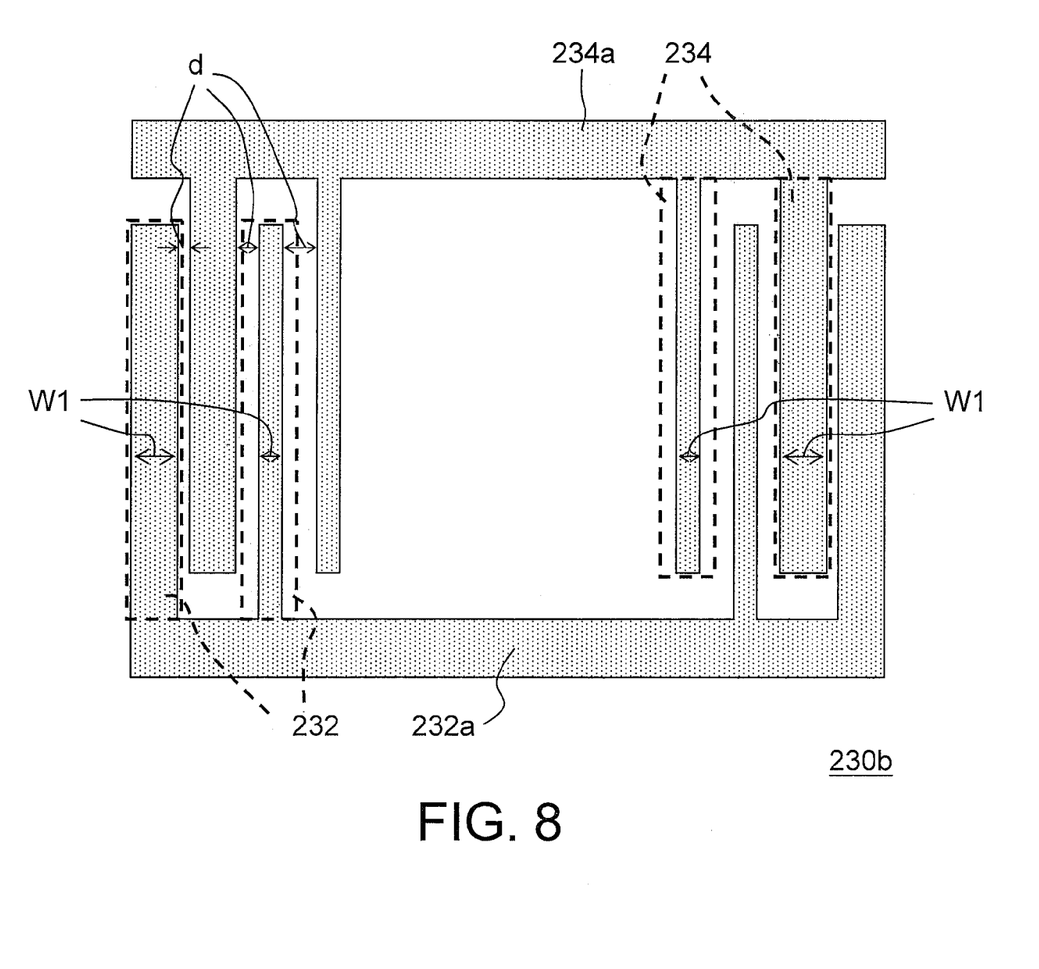
Figure 9:
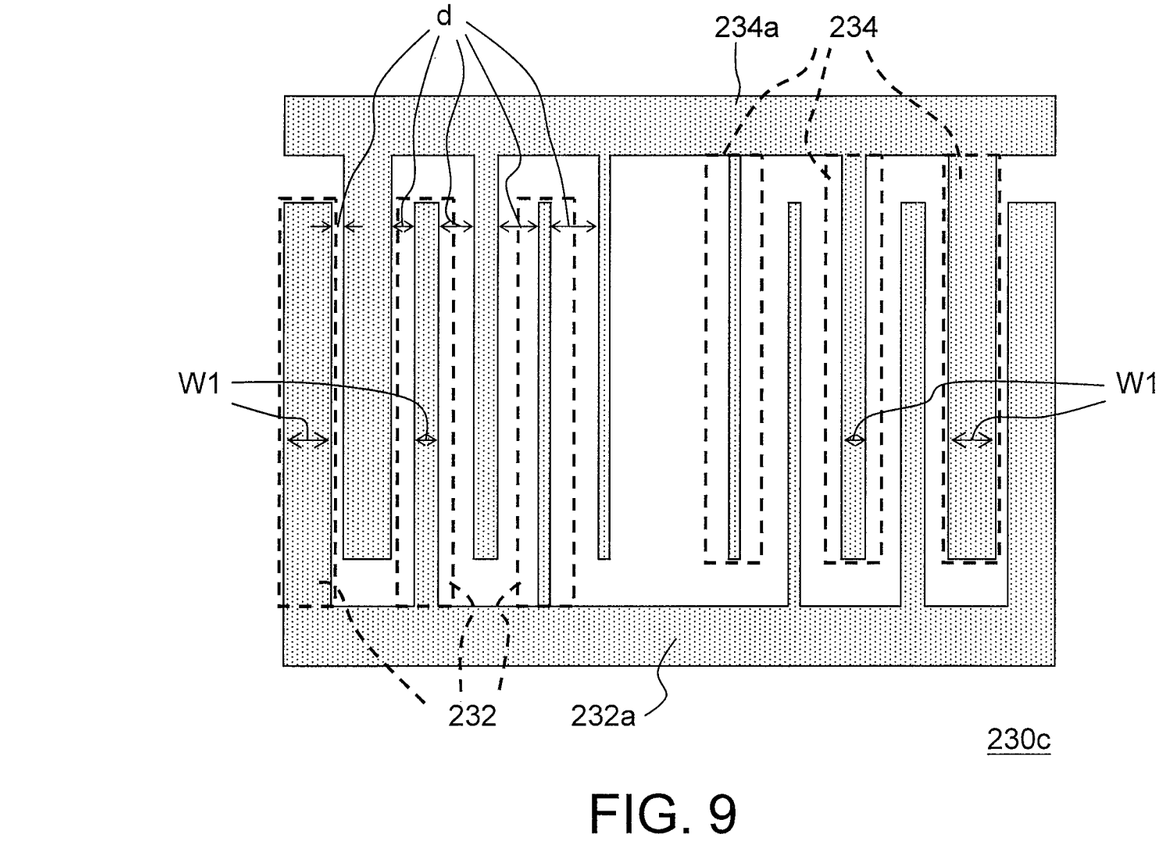

FIGS. 7-9 are respective schematic views of a second electrode layer of a liquid crystal lens in accordance with an embodiment of the invention. For example, the electrode patterns of the above-described second electrode layer 230 may also adopt the patterns of the second electrode layers 230a, 230b, and 230c as illustrated in FIGS. 7-9.

As shown in FIG. 7, compared with the above-described second electrode layer 230, a second electrode layer 230a has a plurality of first and second electrode patterns 232 and 234. Similar to the second electrode layer 230 depicted in FIG. 2, a portion of each of the first and second electrode patterns 232 and 234 has the same width W1. Moreover, the width W2 of other portions of each of the first and second electrode patterns 232 and 234 decreases from the edge to the center of the liquid crystal lens 200. In addition, adjacent first and second electrode patterns 232 and 234 have the same distance d apart. However, it should be understood that the second electrode layers 230 and 230a are merely examples for facilitating description, and the invention is not limited by the quantity of the first and second electrode patterns 232 and 234.

As shown in FIG. 8, in a second electrode layer 230b, each of the first electrode patterns 232 or each of the second electrode patterns 234 are rectangular shaped, for example. Moreover, the width W1 of each of the first and second electrode patterns 232 and 234 decreases from the edge to the center of the liquid crystal lens 200. In other words, the distance d between each of the first electrode patterns 232 and an adjacent one of the second electrode patterns 234 is different. For example, the distance d increases from the edge to the center of the liquid crystal lens 200. Moreover, as shown in FIG. 9, a second electrode layer 230c is similar to the second electrode layer 230b depicted in FIG. 8. Compared with the second electrode layer 230b, the second electrode layer 230c has more first and second electrode patterns 232 and 234.

In light of the foregoing, the liquid crystal lens according to embodiments of the invention has dual electrode patterns with complementing finger shapes to produce the voltage division effect, so that the refractive index variation of the liquid crystal lens approaches the refractive index variation of the ideal lens. In other words, the liquid crystal lens according to embodiments of the invention has a preferable optical imaging characteristic. In particular, the liquid crystal lens according to the invention described herein is simple to use, as a complex voltage control process is not required for each specific electrode. Rather, the voltage division effect of a plurality of electrodes may be generated by a simple electrode pattern design.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A liquid crystal lens, comprising:
   a first substrate;
   a first electrode layer disposed on the first substrate;
   a liquid crystal layer disposed on the first electrode layer; and
   a second electrode layer disposed on the liquid crystal layer, comprising:
   a plurality of first electrode patterns;
   a plurality of second electrode patterns respectively opposite to the first electrode patterns, and the second electrode patterns and the first electrode patterns being alternately arranged, wherein a square measure of the first electrode patterns decreases from an edge of the liquid crystal lens to a center of the liquid crystal lens, so that a resistance of the first electrode patterns increases from the edge of the liquid crystal lens to the center of the liquid crystal lens, a square measure of the second electrode patterns decreases from the edge of the liquid crystal lens to the center of the liquid crystal lens, so that a resistance of the second electrode patterns increases from the edge of the liquid crystal lens to the center of the liquid crystal lens, a portion of each of the first and second electrode patterns has a same width, and a width of other portions of each of the first and second patterns decreases from the edge to the center of the liquid crystal lens.

2. The liquid crystal lens as claimed in claim 1, wherein the second electrode layer further comprises a first main segment and a second main segment, the first main segment is parallel to the second main segment, the first main segment is coupled to the first electrode patterns, the second main segment is coupled to the second electrode patterns, and the first and second electrode patterns are respectively perpendicular to the first and second main segments.

3. The liquid crystal lens as claimed in claim 2, wherein the first main segment is electrically connected to a first signal source, the second main segment is electrically connected to a second signal source, the first and second signal sources respectively providing an alternating current signal to the first and second electrode patterns, such that the first electrode patterns and the second electrode patterns respectively has an amplitude difference and a phase difference.

4. The liquid crystal lens as claimed in claim 3, wherein a voltage range of the alternating current signal is less than 50 volts.

5. The liquid crystal lens as claimed in claim 1, wherein the first and second electrode patterns are disposed on two sides of the liquid crystal lens, the first electrode patterns disposed on one of the sides of the liquid crystal lens are symmetrical with respect to the first electrode patterns disposed on the other side of the liquid crystal lens, and the second electrode patterns disposed on one of the sides of the liquid crystal lens are symmetrical with respect to the second electrode patterns disposed on the other side of the liquid crystal lens.

6. The liquid crystal lens as claimed in claim 5, wherein on one of the sides of the liquid crystal lens, a distance between each of the first electrode patterns and an adjacent one of the second electrode patterns is the same or different.

7. The liquid crystal lens as claimed in claim 1, further comprising:
a first alignment layer disposed between the first electrode layer and the liquid crystal layer; and
a second alignment layer disposed between the liquid crystal layer and the second electrode layer.

8. The liquid crystal lens as claimed in claim 1, further comprising:
a second substrate disposed on the second electrode layer.

9. The liquid crystal lens as claimed in claim 1, further comprising:
a second substrate disposed between the second electrode layer and the liquid crystal layer.

10. The liquid crystal lens as claimed in claim 1, wherein a width of each of the first and second electrode patterns decreases from the edge to the center of the liquid crystal lens.

11. The liquid crystal lens as claimed in claim 1, wherein the width of each of the first and second electrode patterns is between 2 micrometers to 500 micrometers, inclusive.

12. The liquid crystal lens as claimed in claim 1, wherein a material of the first and second electrode layers comprises indium tin oxide (ITO) or indium zinc oxide (IZO).

13. The liquid crystal lens as claimed in claim 1, wherein the first and second electrode patterns are respectively coupled to a plurality of signal sources, the signal sources respectively providing an alternating current signal to the first and second electrode patterns, such that the first electrode patterns and the second electrode patterns respectively has an amplitude difference and a phase difference.

* * * * *